(12) United States Patent
Kay

(10) Patent No.: US 8,636,291 B1
(45) Date of Patent: Jan. 28, 2014

(54) TOOL BUCKET TRANSPORT DEVICE

(76) Inventor: Clint Adam Kay, Orange, TX (US)

( * ) Notice: Subject to any disclaimer, the term of this patent is extended or adjusted under 35 U.S.C. 154(b) by 128 days.

(21) Appl. No.: 13/438,198

(22) Filed: Apr. 3, 2012

Related U.S. Application Data

(60) Provisional application No. 61/478,146, filed on Apr. 22, 2011.

(51) Int. Cl.
*B62B 1/10* (2006.01)

(52) U.S. Cl.
USPC ........................... 280/79.5; 280/47.26

(58) Field of Classification Search
USPC ................................. 280/47.26, 79.5
See application file for complete search history.

(56) References Cited

U.S. PATENT DOCUMENTS

| | | | | |
|---|---|---|---|---|
| 4,753,445 A | * | 6/1988 | Ferrare ................. | 280/47.131 |
| 4,861,050 A | * | 8/1989 | Bergeron ............... | 280/47.35 |
| 4,925,048 A | * | 5/1990 | Noack .................... | 280/79.5 |
| 5,180,179 A | * | 1/1993 | Salvucci ................ | 280/47.315 |
| 5,183,280 A | * | 2/1993 | Gresch .................. | 280/79.5 |
| 5,340,136 A | * | 8/1994 | MacNeil et al. ....... | 280/47.2 |
| 5,393,080 A | * | 2/1995 | Ross ...................... | 280/47.26 |
| 5,433,463 A | * | 7/1995 | Finley .................... | 280/47.16 |
| 5,472,220 A | * | 12/1995 | Stephan ................ | 280/79.5 |
| 5,806,867 A | * | 9/1998 | Hampton .............. | 280/47.34 |
| 5,860,659 A | * | 1/1999 | Hart ...................... | 280/79.5 |
| 6,053,516 A | * | 4/2000 | Ottaway ............... | 280/79.5 |
| 6,135,467 A | * | 10/2000 | Tagariello ............. | 280/79.5 |
| 6,315,310 B1 | * | 11/2001 | Hurt ...................... | 280/79.5 |
| 6,419,246 B1 | * | 7/2002 | Neal ..................... | 280/79.5 |
| 6,454,281 B1 | * | 9/2002 | Pearson ............... | 280/47.26 |
| 6,505,843 B1 | * | 1/2003 | Williams ............... | 280/47.26 |
| 6,565,103 B2 | * | 5/2003 | Wilson .................. | 280/47.24 |
| 6,682,084 B2 | * | 1/2004 | Webster et al. ....... | 280/79.5 |
| 6,715,627 B1 | * | 4/2004 | Bonner et al. ......... | 220/4.27 |
| 6,729,631 B2 | * | 5/2004 | Trine et al. ............ | 280/79.5 |
| 6,733,017 B2 | * | 5/2004 | Intravatola ............ | 280/79.6 |
| 6,851,566 B1 | * | 2/2005 | Bonner ................. | 220/4.27 |
| 6,851,686 B2 | * | 2/2005 | Figueroa ............... | 280/79.5 |
| 7,364,172 B1 | * | 4/2008 | Archer .................. | 280/79.5 |
| 7,384,050 B2 | * | 6/2008 | Blum et al. ............ | 280/47.26 |
| 7,431,313 B1 | * | 10/2008 | Torres et al. .......... | 280/47.26 |
| 7,597,392 B1 | * | 10/2009 | Gilmore ................ | 297/217.1 |
| 7,758,055 B2 | * | 7/2010 | Martinez .............. | 280/79.5 |
| 7,823,907 B1 | * | 11/2010 | Coholan ................ | 280/652 |
| 7,845,656 B2 | * | 12/2010 | Thompson ........... | 280/79.5 |
| 7,942,431 B2 | * | 5/2011 | Merdzo ................. | 280/79.5 |
| D640,029 S | * | 6/2011 | Barnes et al. .......... | D34/18 |
| 7,963,534 B2 | * | 6/2011 | Sloat .................... | 280/79.5 |
| 8,006,996 B1 | * | 8/2011 | Johnston .............. | 280/651 |
| 8,061,723 B1 | * | 11/2011 | Carroll et al. ......... | 280/47.29 |
| 8,262,106 B1 | * | 9/2012 | Suszynsky ............ | 280/47.131 |
| 8,276,923 B2 | * | 10/2012 | Plesh et al. ............ | 280/47.26 |

(Continued)

*Primary Examiner* — Jeffrey J Restifo

(74) *Attorney, Agent, or Firm* — RG Patent Consulting, LLC; Rachel Gilboy

(57) ABSTRACT

A wheeled tool bucket dolly system (Tool Bucket Transport Device) for easily wheel-transporting tools or similar articles from a first location to a second location for use. The system comprises a dolly frame having a handle, a horizontal bucket support, a bucket holder ring, a wheel assembly, and a 5 gallon bucket. The bucket is lowered through the bucket holder ring to rest on a traverse member which is welded to the upper side of the horizontal bucket support. Tools are placed inside the bucket and a user inclines the wheeled tool bucket dolly system via the handle resting all weight on the wheel assembly, and transports tools to a second location for using.

19 Claims, 5 Drawing Sheets

(56) References Cited

U.S. PATENT DOCUMENTS

| | | | |
|---|---|---|---|
| 8,376,376 B2 * | 2/2013 | Thibault | 280/79.5 |
| 2003/0020249 A1 * | 1/2003 | Webster et al. | 280/43 |
| 2003/0102644 A1 * | 6/2003 | Figueroa | 280/47.35 |
| 2004/0245735 A1 * | 12/2004 | Pins | 280/79.5 |

* cited by examiner

TOOL BUCKET TRANSPORT DEVICE

CROSS-REFERENCE TO RELATED APPLICATION

The present applications are related to and claims priority from prior provisional application Ser. Nos. 61/478,146 filed Apr. 22, 2011 which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of dollies and more specifically relates to a wheeled tool bucket dolly system for transporting tools or other similar loads.

2. DESCRIPTION OF THE RELATED ART

Hand trucks or dollies may be used to move heavy loads and bulky objects. The advantage of using a dolly is that a person can transport larger or heavier objects that may not be normally feasible or safe to be carried by one person thereby saving time while reducing the risk of a back injury. A hand truck or dolly is typically an L-shaped handcart with handles at the top end, wheels at the base, and a small flat ledge in front of the wheels to set objects on and transport manually to a second location. The objects to be moved may be tilted forward, the ledge inserted underneath the object, and the objects are then tilted backward to rest on the ledge and dolly frame until the weight is balanced over the wheels, making otherwise bulky and heavy objects easier to move. A dolly is traditionally a first-class lever.

In our modern society, dollies are often adapted to carry specific shapes of loads. A general use dolly may be designed to carry square objects such as boxes or may be specifically designed to carry large, heavy rectangular objects such as refrigerators or other household furniture. Industrial plants have adapted dollies to carry round, heavy objects such as 55 gallon drums containing liquids. The design of a drum dolly has a shape that maximizes leverage and prevents rounded objects from rolling to one side and unbalancing the dolly as might happen if using a general use dolly for carrying drums.

Since hand trucks or dollies are constructed to carry relatively large loads and as such, the dolly itself may be large, heavy, or bulky. Because of this condition, a dolly will almost always only be readily available if one is specifically needed. If an item is small and heavy enough to be inconvenient but has to be carried frequently, most dollies would be 'overkill' and would only add to the burden and inconvenience. In many industrial plants and similar environments, industrial employees have large tool boxes in one area of the plant and frequently have to carry several tools to a different portion of the plant to make repairs to perform maintenance. A common practice is to use 5 gallon buckets to throw tools in to carry to that portion of the plant. With the open top, the tools are easy to see and select as needed. Even though carrying the bucket when it is full of tools can be heavy, a standard dolly would only be an inconvenience due to its bulkiness. Many dollies are easily tipped over. A much smaller, light weight solution to the problem is needed.

Various attempts have been made to solve the above-mentioned problems such as those found in U.S. Pat. Nos. 6,053,516; 6,454,281; 5,860,659; 6,315,310; 6,419,246; and 5,806,867. This prior art is representative of dollies. None of the above inventions and patents, taken either singly or in combination, is seen to describe the invention as claimed.

Ideally, a wheeled tool bucket dolly system should be light weight, and yet, would operate reliably and be manufactured at a modest expense. Thus, a need exists for a reliable wheeled tool bucket dolly system to transport tools or other similar loads and to avoid the above-mentioned problems.

BRIEF SUMMARY OF THE INVENTION

In view of the foregoing disadvantages inherent in the known dolly art, the present invention provides a novel wheeled tool bucket dolly system. The general purpose of the present invention, which will be described subsequently in greater detail, is to provide a small, light weight wheeled tool bucket dolly system that is easy to use, balanced in use and convenient to store.

A wheeled tool bucket dolly system is disclosed herein, in a preferred embodiment comprising a dolly frame having a handle, a vertical column having a top portion and a bottom portion, at least one bucket holder ring, a wheel assembly having an axle, and a horizontal bucket support having a transverse member. The handle is preferably a continuation of the top portion of the vertical column (acting to enhance leverage) and is angled away from a vertical centerline of the vertical column preferably about a 45 degree upward angle away from the vertical centerline of the vertical column. The vertical column is a single uncut cylindrical pipe forming the handle, the vertical column, and the horizontal bucket support using rounded bends to form an S-contour, the S-contour forming a lever. Other contour and materials may be used in alternate embodiments.

The dolly frame preferably has a cross-section diameter of about ¾ of an inch with the handle further comprising a rubber grip. The bucket holder ring comprises flat strap metal and is non-removably and perpendicularly affixed to the vertical column above the horizontal bucket support, and oppositely facing from the handle. The flat strap metal of the bucket holder ring is rolled to form a circle and is rigidly and non-removably mounted to the dolly frame via a spacer between the dolly frame and the bucket holder ring such that the bucket holder ring does not directly contact the dolly frame and provides a space between an inserted bucket and the dolly frame. The feature minimizes stress and undue wear on the bucket and the present invention promoting longevity in both.

The horizontal bucket support is a continuation of the bottom portion of the vertical column, preferably angled about 90 degrees away from the vertical centerline of the vertical column, and oppositely facing from the handle. The transverse member is preferably non-removably and perpendicularly affixed to the horizontal bucket support such that the bottom recess of a bucket, when placed, nestably envelopes within the bucket holder ring and rests upon the transverse member. The transverse member of the horizontal bucket support may be a rigid flat strap having a length such that it nests inside of an inner circumference of a bottom ridge that forms the bottom recess of the bucket and prevents lateral movement. This feature and the fact that the device comprises a bucket holder ring (non-adjustable) that is a through hole receiver able to receive the bucket a suitable distance from the ground serves to prevent tip-overs, breaking of the bucket due to stress, and increases stability of the present invention as it is moved. This increased stability makes the device work well on and over rough terrain.

The dolly frame comprises ferrous metal in preferred embodiments and is of a solid welded construction. The axle of the wheel assembly is perpendicularly inserted through a through-hole in an apex formed by the vertical column and the horizontal bucket support such that the axle is horizontal to a ground planar surface and the wheel assembly is able to hold a load created by the dolly frame and a loaded bucket in coupled combination. The axle is a shaft with at least one wheel removably coupled to each end of the axle which forms the wheel assembly and is positioned to allow the bottom portion to sit level when in the non-traveling condition. The wheel assembly with the horizontal bucket support forms at least a 3-point stand when the wheeled tool bucket dolly system is in an upright non-travel condition. The bucket is removably insertable through the bucket holder ring such that it rests upon the horizontal bucket support and upon the transverse member and tools may be placed in the bucket for access and transport.

The inner circumference of the bucket holder ring is about the same diameter as the outer circumference of the bucket creating a loose-friction-fit so that the bucket can slide into the ring from the top and stop when the ring contacts the enlarged portion of the bucket near the top, and the bottom of the bucket contacts the traverse member. The bucket holder ring encircles an upper portion of an outer circumference of the bucket (making it stable on the top) and the transverse member supports the bucket within the bottom recess of the bucket (making the bottom portion stable) such that the bucket is only removed from the dolly frame with a vertical lift of about the height of the bucket. A user is able to incline the dolly frame via the handle to rest the weight of the wheeled tool bucket dolly system on the wheel assembly to pull-transport the tools to a second location for use.

The wheeled tool bucket dolly system may comprise a kit having a dolly frame with a handle, a wheel assembly; at least one bucket, and a set of user instructions.

A method of use for a wheeled tool bucket dolly system may comprise the steps of inserting a bucket in a bucket holder ring of a wheeled tool bucket dolly system, placing user-preferred tools in the bucket, gripping the handle of the wheeled tool bucket dolly system on the dolly frame, levering the dolly frame to move the wheeled tool bucket dolly system, rolling the wheeled tool bucket dolly system to a second location, using the user-preferred tools, rolling the wheeled tool bucket dolly system with the user-preferred tools to a first location, removing the user-preferred tools, and storing the wheeled tool bucket dolly system for a future use.

The present invention holds significant improvements and serves as a wheeled tool bucket dolly system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, wheeled tool bucket dolly system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a dolly apparatus and more particularly to a wheeled tool bucket dolly system as used to improve the ease and convenience of transporting tools to a second location for using.

Figure 1:
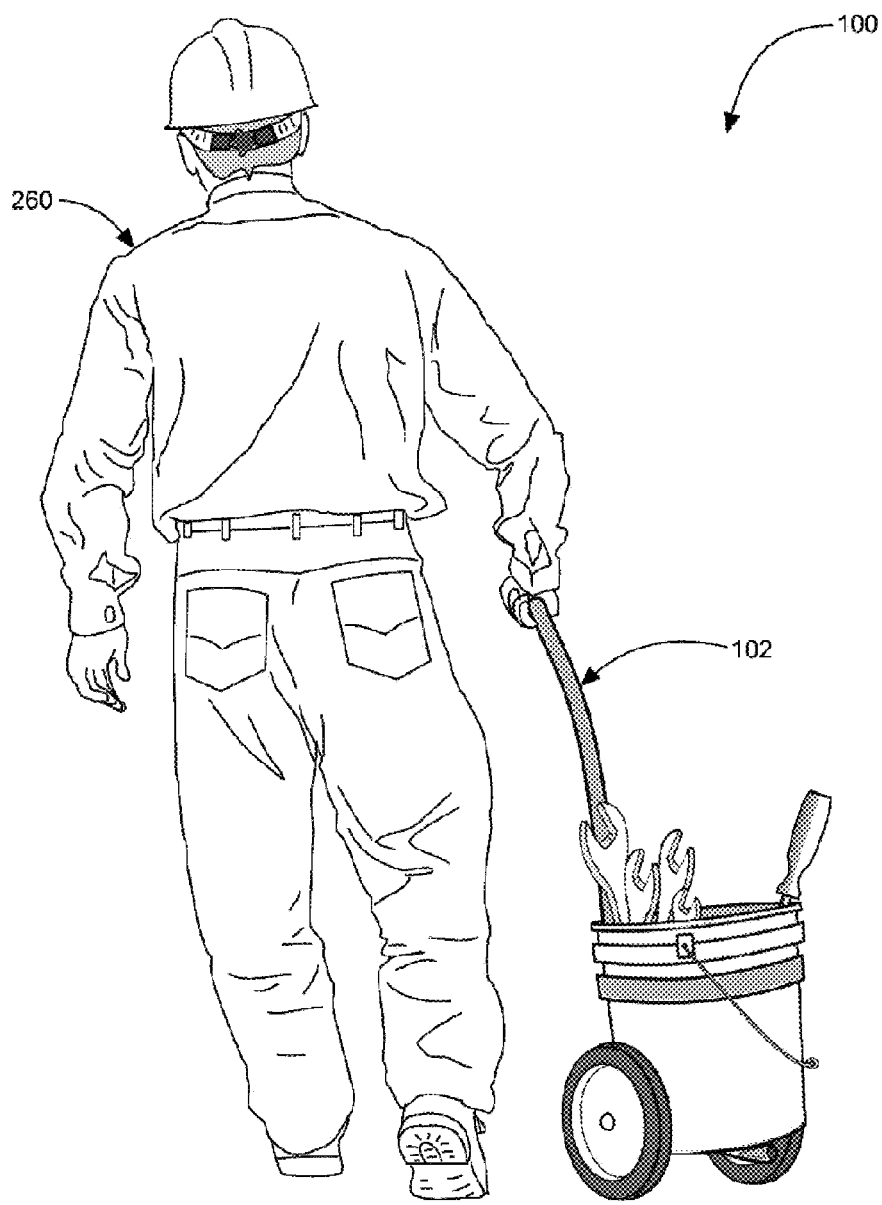
FIG. 1 shows a perspective view illustrating an in-use condition of a wheeled tool bucket dolly system according to an embodiment of the present invention.

Referring to the drawings by numerals of reference there is shown in FIG. 1, a perspective view illustrating an in-use condition of wheeled tool bucket dolly system 100 according to an embodiment of the present invention.

Figure 2:
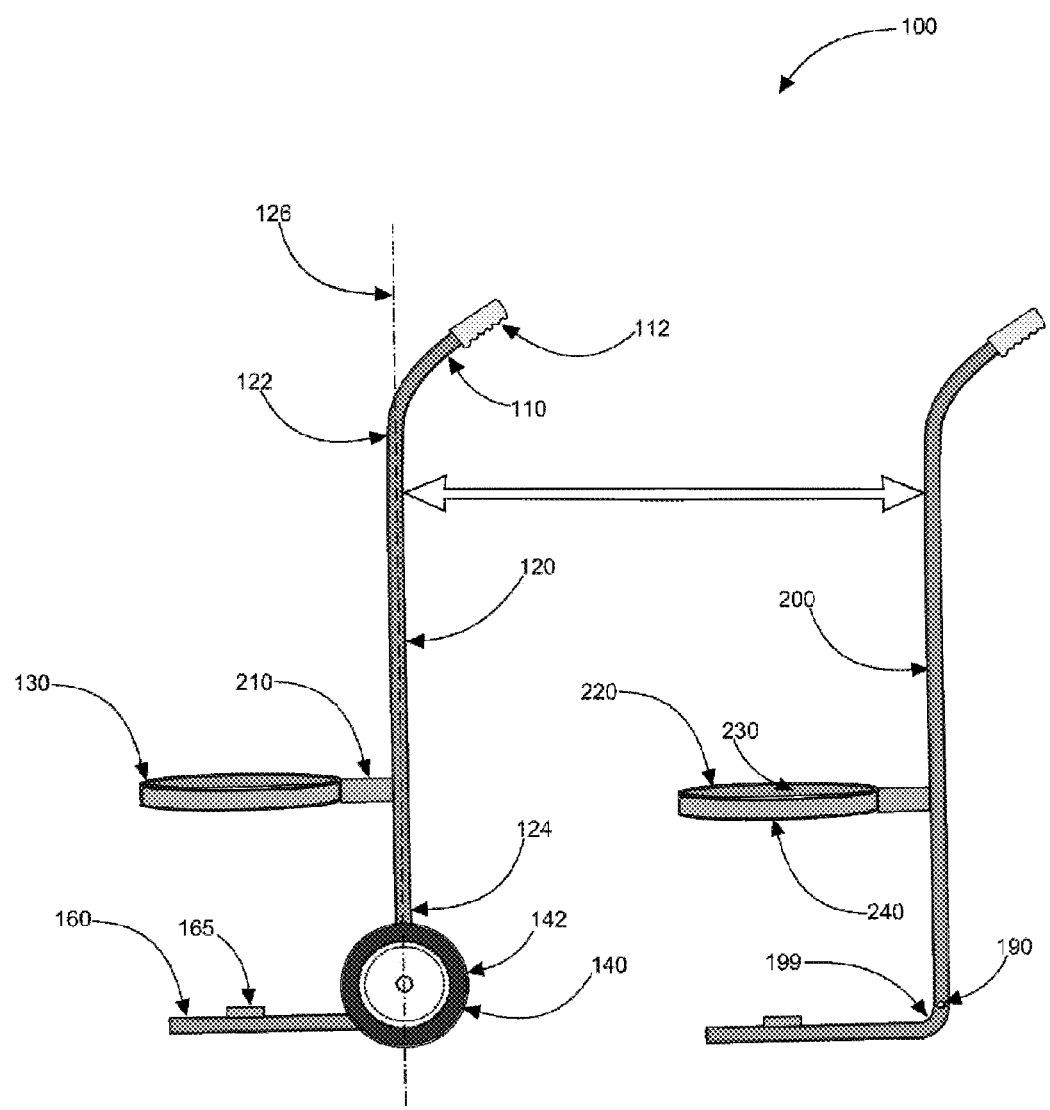
FIG. 2 is a perspective view illustrating a side view of the wheeled tool bucket dolly system according to an embodiment of the present invention of FIG. 1.

Wheeled tool bucket dolly system 100 entitled Tool Bucket Transport Device comprises dolly frame 102 having handle 110, vertical column 120 having top portion 122 and bottom portion 124, at least one bucket holder ring 130, wheel assembly 140 (having axle 150), and horizontal bucket support 160 comprising transverse member 165. Handle 110 is a continuation of top portion 122 of vertical column 120 and is preferably angled away from vertical centerline 126 (as shown in FIG. 2) of vertical column 120. Handle 110 may be offset for left-handed or right-handed users in alternate embodiments and may comprise different orientations.

Bucket holder ring 130 is preferably non-removably and perpendicularly affixed to vertical column 120 above horizontal bucket support 160 and oppositely facing from handle 110. Bucket holder ring 130 is located a suitable height above horizontal bucket support 160 such that bucket 180 is held just below the rim, as shown, thereby providing maximum stability. Bucket holder ring 130 is reasonably wide, thick and rigid such that it provides longevity in-use. Horizontal bucket support 160 is a continuation of bottom portion 124 of vertical column 120, angled about 90 degrees away from vertical centerline 126 of vertical column 120 and oppositely facing from handle 110. This particular design is favorable since it is lightweight, strong and durable however other designs are possible.

Transverse member 165 is preferably non-removably and perpendicularly affixed to horizontal bucket support 160 such that a bottom recess 170 of bucket 180 nestably envelopes horizontal bucket support 160 and rests upon transverse member 165. In this manner bucket 180 is stabilized, further the bottom of bucket 180 is supported such that the weight of tools doesn't become damaged from the weight. Axle 150 of wheel assembly 140 is perpendicularly inserted through a through-hole 190 in an apex 199 formed by vertical column 120 and horizontal bucket support 160 such that axle 150 is horizontal to a ground planar surface and wheel assembly 140 is able to hold a load created by dolly frame 102 and bucket 180 in coupled combination. At least one wheel 142 is removably coupled to each end of axle 150 forming wheel assembly 140. Wheel 142 is in combination with axle 150 such that a slight leverage distance is provided making the device easy to lever-tip, yet remain stable when at rest.

Bucket 180 is removably insertable through bucket holder ring 130 such that it rests upon horizontal bucket support 160 and upon transverse member 165 and tools may be placed in bucket 180 for access and transport and a user is able to incline dolly frame 102 via handle 110 to rest a weight of wheeled tool bucket dolly system 100 with tools inserted into bucket 180 onto wheel assembly 140 to pull-transport tools to a second location for use, as shown in the present figure.

Referring now to FIG. 2, a perspective view illustrating a side view of wheeled tool bucket dolly system 100 (dolly assembly) according to an embodiment of the present invention of FIG. 1.

Vertical column 120 may comprise a single uncut cylindrical pipe 200 forming handle 110, vertical column 120, and horizontal bucket support 160 using rounded bends in a single uncut cylindrical pipe 200 to form an S-contour, S-contour forming a lever. This is preferable since it is relatively inexpensive to manufacture, yet rigid in construction and provides no sharp corners. Handle 110 further comprises rubber grip 112 such that the device is comfortable to pull/manipulate. Horizontal bucket support 160 comprises a stand such that wheeled tool bucket dolly system 100 rests upon horizontal bucket support 160, holding wheeled tool bucket dolly system 100 in an upright position when in a non-traveling condition. Wheel assembly 140 with horizontal bucket support 160 forms at least a 3-point stand when wheeled tool bucket dolly system 100 is in an upright non-travel condition. Handle 110 is preferably angled at about a 45 degree upward angle away from vertical centerline 126 of vertical column 120. Bucket holder ring 130 comprises spacer 210 between dolly frame 102 and bucket holder ring 130 such that bucket holder ring 130 does not directly contact dolly frame 102 and provides a space between an inserted bucket 180 and dolly frame 102. This particular feature allows bucket 180 to be removed with relative ease and that tools can extend at an angle out of the top of bucket 180 but not easily contact the present invention, thus avoiding impact damage. This feature also serves to minimize shock transference through vertical column 120 by creating a isolation member.

Figure 3:
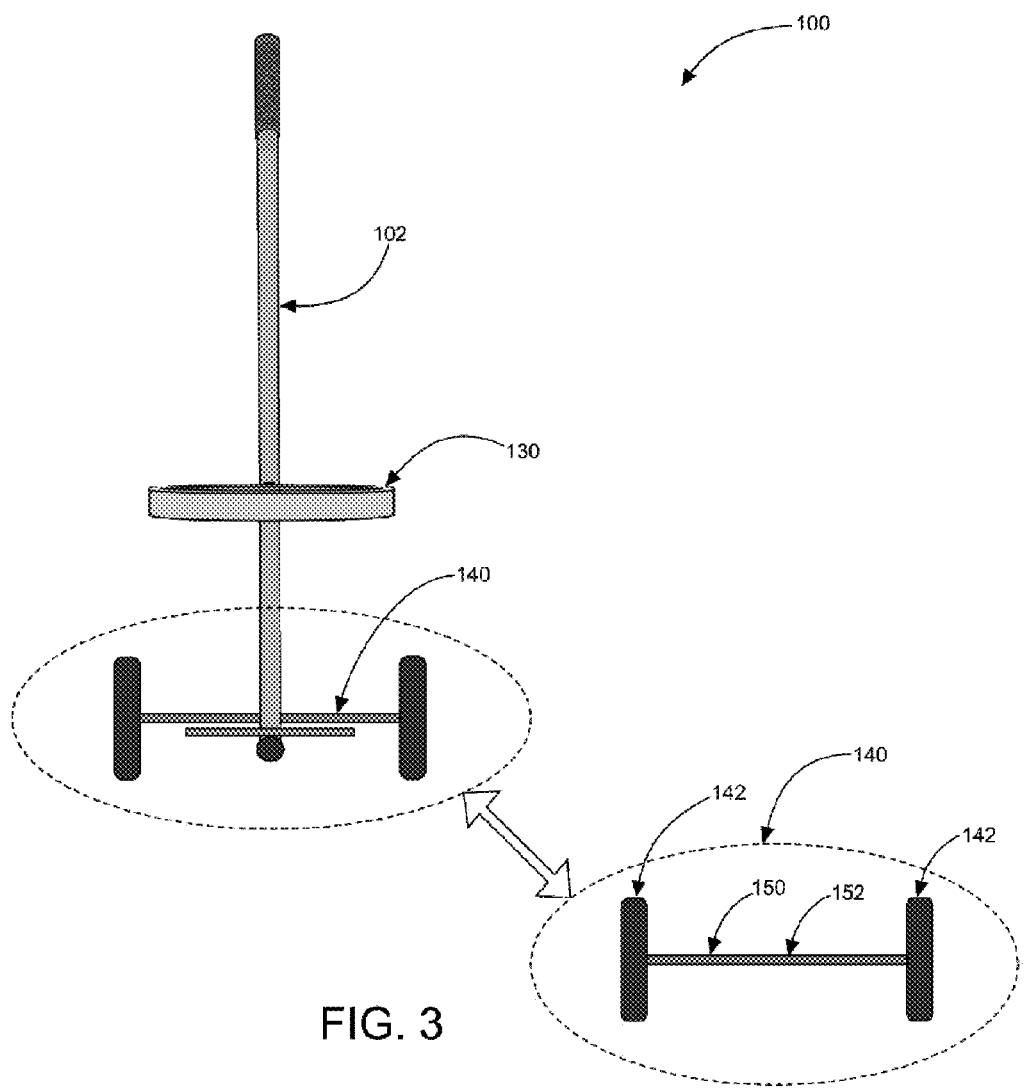
FIG. 3 is a perspective view illustrating a front view of the wheeled tool bucket dolly system according to an embodiment of the present invention of FIG. 1.

Referring now to FIG. 3, a perspective view illustrating a front view of wheeled tool bucket dolly system 100 according to an embodiment of the present invention of FIG. 1.

Transverse member 165 of horizontal bucket support 160 preferably comprises rigid flat strap 220 having a length such that it nests inside of inner circumference 230 of bottom ridge 172 that forms bottom recess 170 of bucket 180. Dolly frame 102 comprises a cross-section diameter of about ¾ of an inch. Bucket holder ring 130 comprises flat strap metal 240. Flat strap metal 240 of bucket holder ring 130 is rolled to form a circle in preferred embodiments. Spacer 210 is rigidly and non-removably affixed to dolly frame 102 and bucket holder ring 130. Dolly frame 102 is of welded construction and comprises ferrous metal or other materials in alternate embodiments.

Figures 4A, 4B:
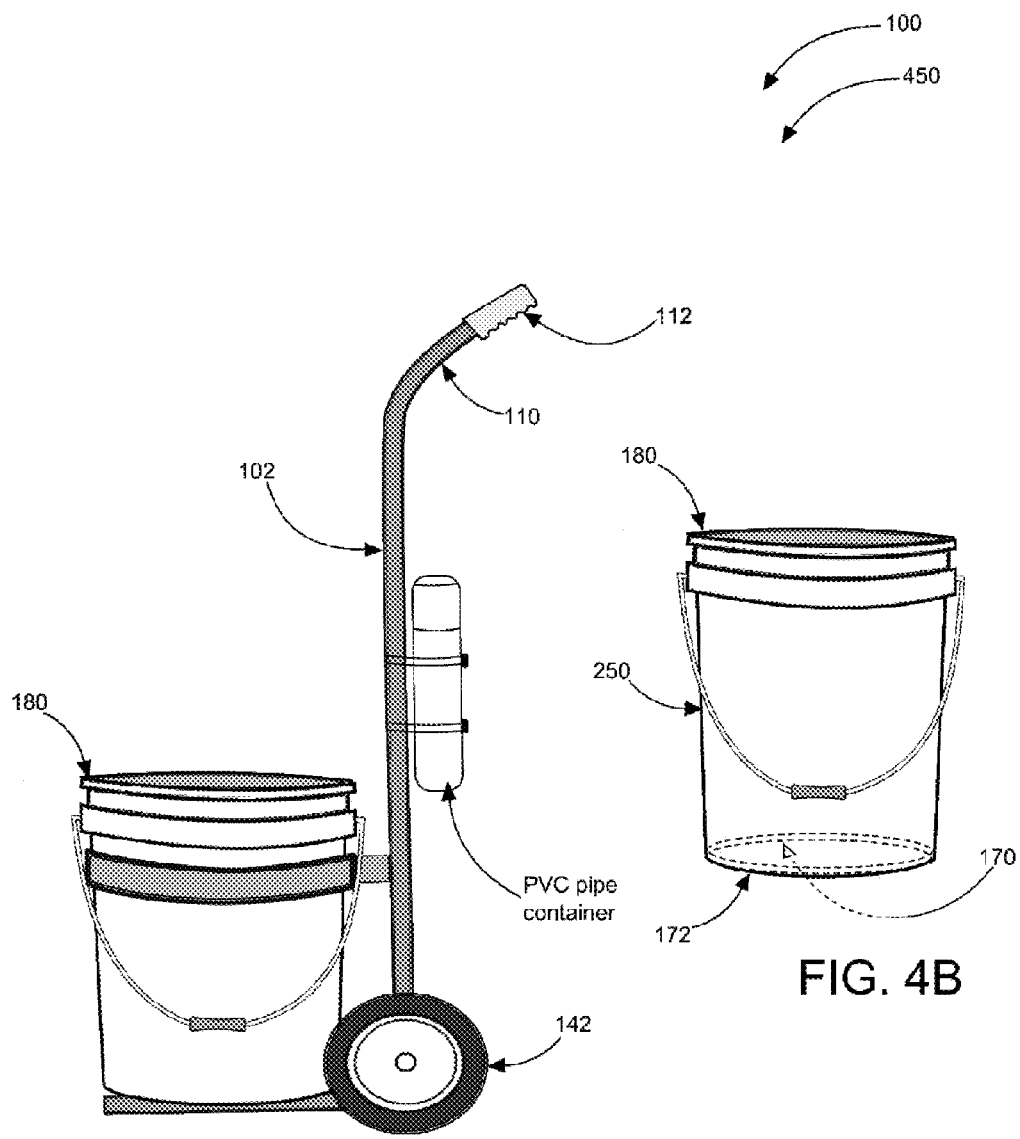
FIGS. 4A and 4B are perspective views illustrating a wheeled tool bucket dolly system with a bucket inserted (received through a bucket holder ring) according to an embodiment of the present invention of FIG. 1.

Referring now to FIGS. 4A and 4B, perspective views illustrating wheeled tool bucket dolly system 100 with a bucket 180 inserted according to an embodiment of the present invention of FIG. 1.

Bucket holder ring 130 encircles an upper portion of an outer circumference 250 of bucket 180 and transverse member 165 supports bucket 180 within bottom recess 170 of bucket 180 such that bucket 180 is only removed from dolly frame 102 with a vertical lift of about a height of bucket 180. An inner circumference 230 of bucket holder ring 130 is about a same diameter as outer circumference 250 of bucket 180 creating a loose-friction-fit, such that bucket 180 can be removed with relative ease, yet is held in place when in transport and/or at rest. Axle 150 comprises shaft 152 positioned to allow bottom portion 124 to sit reasonably level when in non-traveling condition. PVC pipe container (as shown) may be for use in containing/storing documents or holding items such as welding rods. PVC pipe container may be removably held on via straps or other suitable fastening means. Items stored within may be kept from absorbing humidity in ambient environment.

Wheeled tool bucket dolly system 100 according to an embodiment of the present invention of FIGS. 1-4, may be sold as kit 450 comprising the following parts: at least one dolly frame 102 having handle 110; at least one wheel assembly 140; at least one bucket 180; and at least one set of user instructions. Wheeled tool bucket dolly system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different handle and wheel combinations, parts may be sold separately, etc., may be sufficient.

Figure 5:
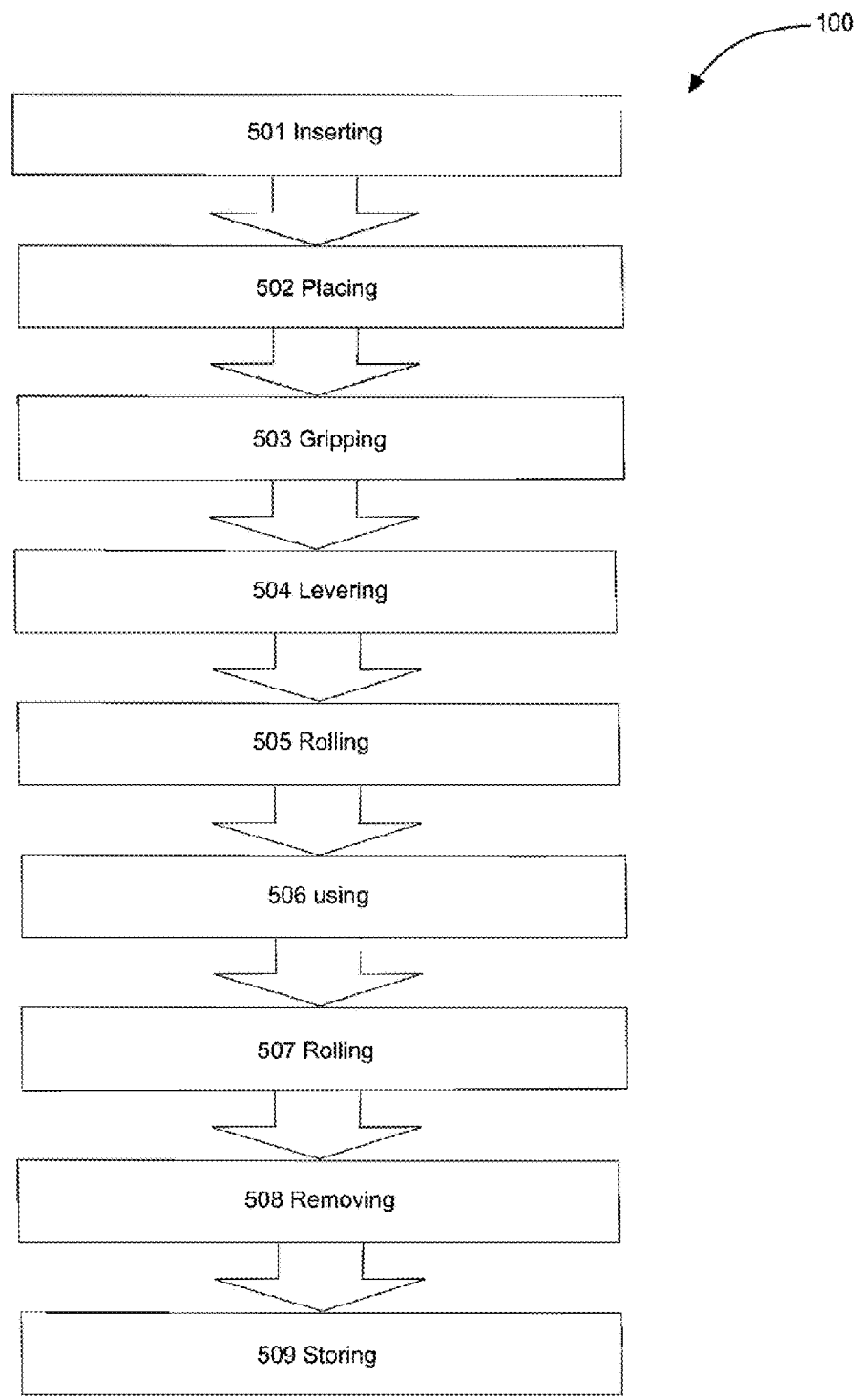
FIG. 5 is a flowchart illustrating a method of use of the wheeled tool bucket dolly system according to an embodiment of the present invention of FIGS. 1-4.

Referring now to FIG. 5, showing a flowchart illustrating method of use 500 for wheeled tool bucket dolly system 100 according to an embodiment of the present invention of FIGS. 1-4.

A method of use 500 for wheeled tool bucket dolly system 100 may comprise the steps of: step one 501 inserting bucket 180 in bucket holder ring 130 of wheeled tool bucket dolly system 100; step two 502 placing user-preferred tools in bucket 180; step three 503 gripping handle 110 of wheeled tool bucket dolly system 100 on dolly frame 102; step four 504 levering dolly frame 102 to move wheeled tool bucket dolly system 100; step five 505 rolling wheeled tool bucket dolly system 100 to a second location; step six 506 using user-preferred tools; step seven 507 rolling wheeled tool bucket dolly system 100 with user-preferred tools to a first location; step eight 508 removing user-preferred tools; and step nine 509 storing wheeled tool bucket dolly system 100.

It should be noted that steps 506-509 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A wheeled tool bucket dolly system comprising:
    a dolly frame having;
        a handle;
        a vertical column having;
            a top portion; and
            a bottom portion;
        at least one bucket holder ring;
        a wheel assembly having an axle;
        a horizontal bucket support having;
            a transverse member; and
        an attachable PVC pipe container for holding documents;
    wherein said handle is a continuation of said top portion of said vertical column and is angled away from a vertical centerline of said vertical column;
    wherein said bucket holder ring is non-removably and perpendicularly affixed to said vertical column above said horizontal bucket support, and oppositely facing from said handle;
    wherein said horizontal bucket support is a continuation of said bottom portion of said vertical column, angled about 90 degrees away from said vertical centerline of said vertical column, and oppositely facing from said handle;
    wherein said transverse member is non-removably and perpendicularly affixed to said horizontal bucket support such that a bottom recess of a bucket nestably envelopes within said horizontal bucket support and rests upon said transverse member;
    wherein said axle of said wheel assembly is perpendicularly inserted through a through-hole in an apex formed by said vertical column and said horizontal bucket support such that said axle is horizontal to a ground planar surface and said wheel assembly is able to hold a load created by said dolly frame and said bucket in coupled combination;
    wherein at least one wheel is removably coupled to each end of said axle forming said wheel assembly;
    wherein said bucket is removably insertable through said bucket holder ring such that it rests upon said horizontal bucket support and upon said transverse member and wherein tools may be placed in said bucket for access and transport; and
    wherein a user is able to incline said dolly frame via said handle to rest a weight of said wheeled tool bucket dolly system with said tools inserted into said bucket onto said wheel assembly to pull-transport said tools to a second location for use.

2. The wheeled tool bucket dolly system of claim 1 wherein said bucket holder ring encircles an upper portion of an outer circumference of said bucket and said transverse member supports said bucket within said bottom recess of said bucket such that said bucket is only removed from said dolly frame with a vertical lift of about a height of said bucket.

3. The wheeled tool bucket dolly system of claim 2 wherein said vertical column is a single uncut cylindrical pipe forming said handle, said vertical column, and said horizontal bucket support using rounded bends in said single uncut cylindrical pipe to form an S-contour, said S-contour forming a lever.

4. The wheeled tool bucket dolly system of claim 3 wherein an inner circumference of said bucket holder ring is about a same diameter as an outer circumference of said bucket creating a loose-friction-fit.

5. The wheeled tool bucket dolly system of claim 4 wherein said transverse member of said horizontal bucket support is a rigid flat strap having a length such that it nests inside of an inner circumference of a bottom ridge that forms said bottom recess of said bucket.

6. The wheeled tool bucket dolly system of claim 5 wherein said handle further comprises a rubber grip.

7. The wheeled tool bucket dolly system of claim 6 wherein said horizontal bucket support is a stand such that said wheeled tool bucket dolly system rests upon said horizontal bucket support, holding said wheeled tool bucket dolly system in an upright position when in a non-traveling condition.

8. The wheeled tool bucket dolly system of claim 7 wherein said wheel assembly with said horizontal bucket support forms at least a 3-point stand when said wheeled tool bucket dolly system is in an upright non-travel condition.

9. The wheeled tool bucket dolly system of claim 6 wherein said handle is angled at about a 45 degree upward angle away from said vertical centerline of said vertical column.

10. The wheeled tool bucket dolly system of claim 7 wherein said axle comprises a shaft, said shaft positioned to allow said bottom portion to sit level when in said non-traveling condition.

11. The wheeled tool bucket dolly system of claim 2 wherein said bucket holder ring comprises flat strap metal.

12. The wheeled tool bucket dolly system of claim 11 wherein said flat strap metal of said bucket holder ring is rolled to form a circle.

13. The wheeled tool bucket dolly system of claim 12 wherein said bucket holder ring comprises a spacer between said dolly frame and said bucket holder ring such that said bucket holder ring does not directly contact said dolly frame and provides a space between said inserted bucket and said dolly frame.

14. The wheeled tool bucket dolly system of claim 13 wherein said spacer is rigidly and non-removably affixed to said dolly frame and said bucket holder ring.

15. The wheeled tool bucket dolly system of claim 14 wherein said dolly frame is of welded construction.

16. The wheeled tool bucket dolly system of claim 15 wherein said dolly frame comprises ferrous metal.

17. The wheeled tool bucket dolly system of claim 1 wherein said dolly frame comprises a cross-section diameter of about ¾ of an inch.

18. A wheeled tool bucket dolly system comprising:
a dolly frame having;
  a handle;
  a vertical column having;
    a top portion; and
    a bottom portion;
  at least one bucket holder ring;
  a wheel assembly having an axle; and
  a horizontal bucket support having;
    a transverse member; and
    an attachable PVC pipe container for holding documents;
wherein said handle is a continuation of said top portion of said vertical column and is angled away from a vertical centerline of said vertical column;
wherein said handle is angled at about a 45 degree upward angle away from said vertical centerline of said vertical column;
wherein said vertical column is a single uncut cylindrical pipe forming said handle, said vertical column, and said horizontal bucket support using rounded bends in said single uncut cylindrical pipe to form an S-contour, said S-contour forming a lever;
wherein said dolly frame comprises a cross-section diameter of about ¾ of an inch;
wherein said handle further comprises a rubber grip;
wherein said bucket holder ring is non-removably and perpendicularly affixed to said vertical column above said horizontal bucket support, and oppositely facing from said handle;
wherein said bucket holder ring comprises flat strap metal;
wherein said flat strap metal of said bucket holder ring is rolled to form a circle;
wherein said bucket holder ring comprises a spacer between said dolly frame and said bucket holder ring such that said bucket holder ring does not directly contact said dolly frame and provides a space between said inserted bucket and said dolly frame;
wherein said spacer is rigidly and non-removably affixed to said dolly frame and said bucket holder ring;
wherein said horizontal bucket support is a continuation of said bottom portion of said vertical column, angled about 90 degrees away from said vertical centerline of said vertical column, and oppositely facing from said handle;
wherein said transverse member is non-removably and perpendicularly affixed to said horizontal bucket support such that a bottom recess of a bucket nestably envelopes within said horizontal bucket support and rests upon said transverse member;
wherein said transverse member of said horizontal bucket support is a rigid flat strap having a length such that it nests inside of an inner circumference of a bottom ridge that forms said bottom recess of said bucket;
wherein said dolly frame is of welded construction;
wherein said dolly frame comprises ferrous metal;
wherein said axle of said wheel assembly is perpendicularly inserted through a through-hole in an apex formed by said vertical column and said horizontal bucket support such that said axle is horizontal to a ground planar surface and said wheel assembly able to hold a load created by said dolly frame and said bucket in coupled combination;
wherein at least one wheel is removably coupled to each end of said axle forming said wheel assembly;
wherein said horizontal bucket support is a stand such that said wheeled tool bucket dolly system rests upon said horizontal bucket support, holding said wheeled tool bucket dolly system in an upright position when in a non-traveling condition;
wherein said axle comprises a shaft, said shaft positioned to allow said bottom portion to sit level when in said non-traveling condition;
wherein said wheel assembly with said horizontal bucket support forms at least a 3-point stand when said wheeled tool bucket dolly system is in an upright non-travel condition;
wherein said bucket is removably insertable through said bucket holder ring such that it rests upon said horizontal bucket support and upon said transverse member and wherein tools may be placed in said bucket for access and transport;
wherein an inner circumference of said bucket holder ring is about a same diameter as an outer circumference of said bucket creating a loose-friction-fit;
wherein said bucket holder ring encircles an upper portion of an outer circumference of said bucket and said transverse member supports said bucket within said bottom recess of said bucket such that said bucket is only removed from said dolly frame with a vertical lift of about a height of said bucket; and
wherein a user is able to incline said dolly frame via said handle to rest a weight of said wheeled tool bucket dolly system with said tools inserted into said bucket onto said wheel assembly to pull-transport said tools to a second location for use.

19. The wheeled tool bucket dolly system of claim 18 further comprising a kit having:
said dolly frame having said handle;
said wheel assembly;
said at least one bucket; and
a set of user instructions.

* * * * *